United States Patent

Blake et al.

[11] Patent Number: 5,786,017
[45] Date of Patent: Jul. 28, 1998

[54] PARTICULATE FLAVOR COMPOSITIONS AND PROCESS TO PREPARE SAME

[75] Inventors: Anthony Blake, Nyon; Philip Attwool, Geneva, both of Switzerland

[73] Assignee: Firmenich SA, Geneva, Switzerland

[21] Appl. No.: 646,307

[22] PCT Filed: Oct. 17, 1994

[86] PCT No.: PCT/IB94/00319

§ 371 Date: May 15, 1996

§ 102(e) Date: May 15, 1996

[87] PCT Pub. No.: WO96/11589

PCT Pub. Date: Apr. 25, 1996

[51] Int. Cl.⁶ .................................................. A23L 1/22
[52] U.S. Cl. .................. 426/534; 426/98; 426/516; 426/650; 426/651
[58] Field of Search .................. 426/534, 650, 426/651, 516, 96, 98

[56] References Cited

U.S. PATENT DOCUMENTS

| | | | |
|---|---|---|---|
| 2,809,895 | 10/1957 | Swisher | 99/140 |
| 3,314,803 | 4/1967 | Dame, Jr. et al. | 99/140 |
| 3,554,768 | 1/1971 | Feldman | 99/140 |
| 3,704,137 | 11/1972 | Beck | 99/140 |
| 3,736,149 | 5/1973 | Knapp | 99/78 |
| 3,764,346 | 10/1973 | Noznick et al. | 426/651 |
| 3,914,439 | 10/1975 | Graves | 426/651 |
| 4,448,789 | 5/1984 | Yang | 426/651 |
| 4,610,890 | 9/1986 | Miller et al. | 426/651 |
| 4,689,235 | 8/1987 | Barnes et al. | 426/651 |
| 4,707,367 | 11/1987 | Miller et al. | 426/96 |
| 4,820,534 | 4/1989 | Saleeb et al. | 426/96 |
| 5,009,900 | 4/1991 | Levine et al. | 426/96 |
| 5,087,461 | 2/1992 | Levine et al. | 426/96 |
| 5,124,162 | 6/1992 | Boskovic et al. | 426/651 |
| 5,506,353 | 4/1996 | Subramaniam | 426/651 |

FOREIGN PATENT DOCUMENTS

| | | |
|---|---|---|
| 2 204 190 | 5/1974 | France. |
| WO 86/00502 | 1/1986 | WIPO. |
| WO 94/06308 | 3/1994 | WIPO. |

*Primary Examiner*—Lien Tran
*Attorney, Agent, or Firm*—Pennie & Edmonds LLP

[57] ABSTRACT

The process provides particulate flavor compositions having a flavor oil fixed in a particulate polyol material. It consists in mixing a mono- or disaccharide, a polysaccharide and water with a minor but flavor effective amount of a flavor oil such that the resulting particular flavor compositions possess a Tg below room temperature, and extruding the resulting homogeneous substrate at a temperature to form a melt which on cooling solidifies as a hard rubbery amorphous material having the flavor oil entrapped therein.

18 Claims, No Drawings

PARTICULATE FLAVOR COMPOSITIONS AND PROCESS TO PREPARE SAME

TECHNICAL FIELD AND PRIOR ART

It is well known in the food industry that the addition of flavouring ingredients contribute to a major extent to the palatability of consumable edible materials; consequently, it is paramount to ensure the production of food products which are of consistent flavour quality and are thus attractive to consumers. This can be achieved by ensuring proper flavour release. In effect, taste and aroma are greatly influenced by volatile components present in such products. However, because of the volatility of these compounds, it is not easy to ensure that the predetermined critical amounts of each flavour components be present in the food and products as they reach the consumer. Losses of volatile components might occur during storage prior to incorporation into the food product, during mixing of the flavour component with the other food ingredients, during food processing, cooking, baking, during transportation and storage and finally during the preparation of the food product by the consumer himself.

These losses of volatile components from the food products may produce undesirable variations in the taste and aroma of the products as perceived by the consumer. On the other hand, losses of volatile components might occur through the conversion of certain flavour materials into unwanted less desirable or tasteless chemicals by their interaction with reagents present in the environment. Oxygen is an example of this type of reagent as it promotes the conversion of several labile flavour materials of current and critical utilization in the industry.

It is not surprising therefore to observe that, in order to reduce or eliminate the aforementioned problems associated with volatile and labile flavour components, various attempts have been made to encapsulate such components in certain carbohydrate matrices so as to reduce the volatility or lability of the components. This results in the preparation of stable free flowing powders containing the flavour compositions for later flavour release when incorporated into the food products or when the food product is eventually consumed.

Typical examples of flavour fixation on carbohydrate matrices are provided in U.S. Pat. Nos. 3,314,803; 3,554,768 and 3,736,149. These patents are mainly concerned with the problem associated with the stability of acetaldehyde in different flavour systems. For instance, U.S. Pat. No. 3,554,768 suggests the use of lactose, lactose-maltose, larch-gum, tapioca dextrin and gum Arabic as matrices for encapsulation of acetaldehyde by the method of spray-drying.

U.S. Pat. No. 3,736,149 discloses flavouring compositions which comprise a flavouring agent including acetaldehyde fixed in a matrix material containing lactose, a hydrocolloid gum and a starch hydrolysate.

U.S. Pat. No. 2,809,895 describes a process for encapsulation of an essential oil, such as lemon, lime or grapefruit oils, in a matrix comprising corn syrup, antioxidant and dispersing agent. The essential oil, antioxidant and dispersing agent are added to the corn syrup, the resultant mixture is heated to 85°–125° C. and agitated or extruded to form an emulsion in pellet form, and the resulting particles are washed with a solvent and finally dried.

U.S. Pat. No. 3,704,137 describes an essential oil composition formed by mixing oil with an antioxidant, separately mixing water, sucrose and hydrolyzed cereal solids with DE below 20, emulsifying the two mixtures together, extruding the resulting mixture in the form of rods into a solvent, removing the excess solvent and finally, adding an anti-caking agent.

U.S. Pat. Nos. 4,610,890 and 4,707,367 describe a process for preparing a solid essential oil composition having a high content of the essential oil, which composition is prepared by forming an aqueous solution containing a sugar, a starch hydrolysate and an emulsifier. The essential oil is blended with the aqueous solution in a closed vessel under controlled pressure to form a homogeneous melt, which is then extruded into a relatively cold solvent, dried and combined with an anti-caking agent.

The above-mentioned patents are merely illustrative of the considerable volume of patent literature related to the fixation of flavour ingredients in various matrices.

In essence, all of the above patents disclose the encapsulation of flavour materials in glass like polymeric materials. The understanding of the glassy state and its importance in food products has been considerably extended in recent years. Several methods of creating glass like states have been reported including the shock cooling of a polymeric melt to create a vitreous solidified matrix and more recently the use of extrusion cooking as a means of melting and intermixing a polymeric base material with the flavourant or other material to be encapsulated and then extrusion of this viscous material into a cooling system thus entrapping the flavourant within the matrix.

U.S. Pat. No. 5,009,900 describes such a process, a key embodiment of which is the requirement that the resulting encapsulated flavour has a glass transition temperature (Tg) significantly above the temperature at which it is stored and used. The critical temperature was recognized as being of at least 40° C.

The concept of glass transition temperature is well described in the literature.

It represents the transition temperature from a rubbery phase to a glass; such a transition is characterised by a rapid increase in viscosity over several orders of magnitude, over a rather small temperature range. It is recognized by many experts in the field that in the glassy state, i.e. at temperatures below Tg, all molecular translation is halted and it is this process which provides such effective entrapping of the flavour volatiles and prevention of other chemical events such as oxidation.

Implicit in much of the literature is the converse, namely that at temperatures above Tg, the encapsulation of flavour molecules will be ineffective and hence the importance of creating polymeric encapsulating materials with Tg values above ambient temperature.

DESCRIPTION OF THE INVENTION

We have discovered that, contrary to this prior assumption, it is possible to create materials which have glass transition temperatures below ambient temperature and which nevertheless are perfectly effective at entrapping and stabilising flavouring systems over long periods of time.

Furthermore, the resulting particulate flavour compositions are less hygroscopic than the materials currently available.

The present invention provides a process for the preparation of particulate flavour compositions comprising a flavour oil fixed in a particulate polyol material, which process comprises:

a. mixing a mono- or disaccharide, a polysaccharide and water with a minor but flavour effective amount of a flavour oil to form a homogeneous substrate such that the resulting particulate flavour compositions possess a Tg below room temperature; and b. extruding said homogeneous substrate at a temperature sufficient to form a melt which on cooling solidifies as a hard rubbery and amorphous material having said flavour oil entrapped therein.

MODES OF CARRYING OUT THE INVENTION

Preferred mono- or disaccharides used in the process of the invention include, for example, sucrose, glucose, lactose, fructose, maltose and glucopyranosylmannitol or glucopyranosylsorbitol.

Preferred polysaccharides capable to provide, when treated according to the process of the invention, particulate flavour compositions having a glass transition temperature below room temperature, include maltodextrins having a DE of less than 18, preferably of less than 10, and more preferably of 1 to 6.

Maltodextrins are essentially polysaccharides of various commercial origins. One specific maltodextrin which has been found to give good results in the process of the invention is Paselli SA 2 (origin: Avebe, The Netherlands)

We have found that the particulate flavour compositions resulting from the process of the invention not only are perfectly effective at entrapping and stabilising flavouring volatiles over a prolonged period of time, but also they are less hygroscopic than materials currently available.

The resulting blend of mono- or disaccharides with maltodextrins, blend to which there is added the flavour oil before extrusion, possesses high viscosities. For this reason it is recommended to use a continuous cooker extruder; this would achieve a better heating, mixing and pumping of the encapsulating system. Preferred is a twin screw extruder, wherein the screw configuration has been selected to provide heating and mixing zones which create a suitable hot polymeric melt.

The proportions of mono- or disaccharides relative to maltodextrin are typically of equal parts. They can vary however from 1 part of maltodextrine with 0.2–4 parts of mono- or disaccharide.

The flavour oil to be encapsulated can either be admixed into the feedstock of the extruder or it can be injected directly into the molten mass within the barrels of the extruder followed by a subsequent zone of intense mixing action. Within the mixing zone the oil is thoroughly dispersed within the matrix and, if desired, appropriate emulsifiers can also be incorporated into the matrix to aid its dispersal. The remaining sections of the extruder convey the hot plastic material to the suitable die face where it is extruded into desired shape and cooled.

During the cooling process the viscosity and consequent hardness of the material rises and the obtained material can be broken or cut to provide particles of the desired size.

The resulting particulate flavour composition obviates the disadvantages shown by most prior known analogous systems. In effect, food products which possess a glass transition temperature close to room temperature undergo frequent changes of their physical state, as a consequence of the fluctuation of ambient temperature around the Tg of the product. Such changes in state are frequently the cause of caking or other undesirable properties of the food.

By providing flavour composition with Tg values below the ambient temperature, or anyhow below the temperatures to which the food is stored or used, no such changes of state will take place.

It is also a well known fact that the ingress of water into the food product can significantly reduce the glass transition temperature and lower it to room temperature with consequent change in the product stability. The polymeric material, as obtained in the process of the invention, wherein the glass transition temperature is below room temperature will be subject to much less change in its properties since adsorption of water will not bring the Tg up to ambient temperature but will depress it still further.

As indicated above water is added to the intimate mixture of mono- or disaccharide and polysaccharide before extrusion. We have found that adequate proportions of water is of between 5 and 10% by weight, based on the total weight of the mixture. With this concentration of initial water content, the resulting particulate compositions will show a water content sufficient to lower their Tg to values below ambient temperature, while maintaining good flowing properties.

A further advantage of the present invention is the ability to provide flavour systems which can be effective in so called low water activity foods. It is well known that below certain well defined levels of water activity, as measured by the Aw value, the processes of microbiological spoilage are halted. The use of encapsulated systems where the Tg values lie below room temperature, as obtained by the process of the invention, allows much more flexibility in designing flavours which are effective in moderate or low moisture foods since the adsorption of water produces gradual changes in texture rather than the drastic textural changes observed when a material passes through its glass transition.

The terms "flavour oil" as used herein are deemed to define a variety of flavour materials of both natural and synthetic origin; they include single compounds or mixtures. The process of the invention may be employed to encapsulate volatile or labile components which may be in liquid and solid form. Specific examples of such components may be found in the current literature, e.g. in Perfume and Flavor Chemicals by S. Arctander, Montclair N.J. (USA); Fenaroli's Handbook of Flavor Ingredients, CRC Press or Synthetic Food Adjuncts by M.B. Jacobs, van Nostrand Co., Inc.

Natural extracts can also be encapsulated into the systems of the invention; these include e.g. citrus fruit extracts, such as lemon, orange, lime, grapefruit or mandarine oil, or coffee, tea, cocoa, mint or vanilla.

The particulate flavour compositions of the invention may be employed as adjuvants to a wide variety of food products, including confectionery products and chewing gums. The compositions may also be added to plant leaves typically used for infusions or decoctions, especially for the aromatisation of tea leaves or tea fines.

The proportions in which the flavour oil is added into the saccharide mass prior to extrusion may vary in accordance with the nature of the food products to be flavoured and the particular organoleptic effect it is desired to achieve. The expert in the art knows by experience how to assess this parameter for obtaining a well balanced and harmonious aroma in a given food or beverage. Obviously, for economic reasons it is preferred to incorporate the highest possible proportions of flavour oil. Typically, the compositions of the invention encapsulate up to 20% (weight percent) of oil, more typically of 8–12%.

The invention is illustrated but not limited to the following examples. Temperatures are given in degrees centigrade and abbreviations have the meaning common in the art.

EXAMPLE 1

A free flowing powder was prepared by blending the following ingredients in the proportions indicated

| Ingredients | Parts by weight |
| --- | --- |
| Saccharose | 42.6 |
| Maltodextrin [1] (DE = 2) | 42.6 |
| Water | 4.3 |
| Orange oil [2] | 10.0 |
| Lecithin | 0.5 |
| Total | 100.0 |

[1] Paselli SA 2 (origin: Avebe, The Netherlands)
[2] Florida 1121 GT-20.5.99 (origin: Firmenich)

The powder was fed into a twin screw cooker extruder (Clextral BC21) and heated to 150° at the central section of the extruder and 95° at the die face.

The extruder was equipped with a high shear mixing zone located after the high temperature section. The blend was decrystallised in this process and extruded as a plastic ribbon which rapidly hardened to give a hard snappable solid which contained entrapped therein the orange oil. The water content of the material was measured to be 7.6%.

Subsequent differential scanning calorimetry (DSC) showed the sample to have a glass transition temperature (Tg) of 12°. Although the material was stored at a temperature which was almost 10° above the Tg, it remained stable and resistant to moisture uptake and did not become sticky.

When exposed to air at relative humidity of 83% the material stayed hard, brittle and non-sticky after 4 days.

The proportion of orange oil encapsulated in the matrix after extrusion was measured as 8.5% (weight percent), i.e. 85% retention was achieved.

The orange oil remained entrapped in the material even after exposure to high humidity.

EXAMPLE 2

A free flowing powder was prepared by blending the following ingredients in the proportions indicated

| Ingredients | Parts by weight |
| --- | --- |
| Palatinit ® [1] | 42.6 |
| Maltodextrin [2] (DE = 2) | 42.6 |
| Water | 4.3 |
| Orange oil | 10.0 |
| Lecithin | 0.5 |
| Total | 100.0 |

[1] Equimolecular mixture of α,δ-glucopyranosyl-1,6-mannitol and α,δ-glucopyranosyl-1,6-sorbitol (origin: Süssungsmittel GmbH, Germany)
[2] Paselli SA 2 (origin: Avebe, The Netherlands)

Extrusion was carried out as indicated in Example 1 with a temperature in the central zone at 160° and an exit temperature of 90°. The resulting material was hard and brittle and had a water content of 6.9% and a Tg of 18°.

Exposed to air with a humidity content of 91% for a 5 day period, the material became somewhat pliable but was nevertheless hard and was not sticky.

We claim:

1. A process for the preparation of particulate flavour compositions comprising a flavour oil fixed in a particulate polyol material, which comprises:
   a. mixing selected amounts of mono- or disaccharide, polysaccharide and water with a minor but flavour effective amount of a flavour oil in order to form a homogeneous substrate possessing a Tg below room temperature; and
   b. extruding said homogeneous substrate at a temperature sufficient to form a melt which on cooling solidifies as a hard rubbery and amorphous material having said flavour oil entrapped therein.

2. The process of claim 1, wherein the mono- or disaccharide is chosen from the group consisting of sucrose, glucose, fructose, lactose, maltose and glucopyranosylmannitol or glucopyranosylsorbitol.

3. The process of claim 1, wherein the polysaccharide is a maltodextrin having a DE below 18.

4. The process of claim 3, wherein the maltodextrin has a DE of from 1 to 6.

5. The process of claim 1 wherein the amount of water added to the mixture of mono- or disaccharide and polysaccharide is of between 5 and 10% by weight based on the total weight of the mixture.

6. A particulate flavour composition having a Tg below room-temperature prepared according to the process of claim 1.

7. A particulate flavour composition according to claim 6 comprising about 0.2–4 parts by weight of mono- or disaccharide and about 1 part by weight of maltodextrin having a DE of 1 to 6.

8. An edible consumable material containing a flavour effective amount of a particulate flavour composition according to claim 6.

9. Method for the aromatisation of tea leaves, tea powders or tea extracts, which comprises adding thereto a flavour effective amount of a composition according to claim 6.

10. A process for the preparation of a flavour composition comprising a flavour oil entrapped in an amorphous matrix, which process comprises:

mixing selected amounts of mono- or disaccharide, polysaccharide, water and a flavour effective amount of a flavour oil in order to form a homogeneous substrate possessing a $T_g$ below room temperature;

extruding said homogeneous substrate at a temperature sufficient to form a melt; and cooling the homogeneous substrate melt to form an amorphous matrix having said flavour oil entrapped therein.

11. The process of claim 10, wherein the mono- or disaccharide is chosen from the group consisting of sucrose, glucose, fructose, lactose, maltose and glucopyranosylmannitol or glucopyranosylsorbitol.

12. The process of claim 10, wherein the polysaccharide is a maltodextrin having a DE below 18.

13. The process of claim 12, wherein the maltodextrin has a DE of from 1 to 6.

14. The process of claim 10, wherein the amount of water added to the mixture of mono- or disaccharide and polysaccharide is between 5 and 10% by weight based on the total weight of the mixture.

15. A flavour composition comprising a flavour oil entrapped in an amorphous matrix of a solidified mixture of selected amounts of mono- or disaccharide, polysaccharide, and water, to provide said matrix with a $T_g$ below room temperature.

16. A flavour composition according to claim 15 comprising about 0.2–4 parts by weight of mono- or disaccharide and about 1 part by weight of maltodextrin having a DE of 1 to 6.

17. An edible consumable material containing a flavour effective amount of a flavour composition according to claim 15.

18. Method for the aromatisation of tea leaves, tea powders or tea extracts, which comprises adding thereto a flavour effective amount of a flavour composition according to claim 15.

* * * * *